United States Patent
Bang et al.

(10) Patent No.: US 11,072,302 B2
(45) Date of Patent: Jul. 27, 2021

(54) KNEE AIRBAG FOR VEHICLES

(71) Applicants: Hyundai Motor Company, Seoul (KR); Kia Motors Corporation, Seoul (KR); Hyundai Mobis Co., Ltd., Seoul (KR)

(72) Inventors: Jun Ho Bang, Gyeonggi-do (KR); Ji Yong Yim, Gyeonggi-do (KR); Seok Hoon Ko, Gyeonggi-do (KR); Do Hyung Kim, Gyeonggi-do (KR)

(73) Assignees: Hyundai Motor Company, Seoul (KR); Kia Motors Corporation, Seoul (KR); Hyundai Mobis Co., Ltd., Seoul (KR)

(*) Notice: Subject to any disclaimer, the term of this patent is extended or adjusted under 35 U.S.C. 154(b) by 79 days.

(21) Appl. No.: 16/545,707

(22) Filed: Aug. 20, 2019

(65) Prior Publication Data

US 2020/0324729 A1 Oct. 15, 2020

(30) Foreign Application Priority Data

Apr. 15, 2019 (KR) .................. 10-2019-0043466

(51) Int. Cl.
*B60R 21/05* (2006.01)
*B60R 21/203* (2006.01)
(Continued)

(52) U.S. Cl.
CPC .......... *B60R 21/2035* (2013.01); *B60R 21/05* (2013.01); *B60R 21/231* (2013.01); *B62D 1/187* (2013.01); *B62D 1/197* (2013.01); *B60R 2021/0051* (2013.01); *B60R 2021/0414* (2013.01); *B60R 2021/23169* (2013.01)

(58) Field of Classification Search
CPC ........ B60R 2021/23169; B60R 21/206; B60R 21/05; B62D 1/197
See application file for complete search history.

(56) References Cited

U.S. PATENT DOCUMENTS 7,938,442 B2 * 5/2011 Matsuo ................. B60R 21/206
  280/731
7,967,327 B2 * 6/2011 Kim ..................... B60R 21/206
  280/728.2

(Continued)

FOREIGN PATENT DOCUMENTS

EP  1 571 048 A2  9/2005
EP  2 077 955 A1  7/2009

(Continued)

*Primary Examiner* — Nicole T Verley
(74) *Attorney, Agent, or Firm* — Mintz Levin Cohn Ferris Glovsky and Popeo, P.C.; Peter F. Corless

(57) ABSTRACT

A knee airbag for vehicles is provided. The knee airbag includes a lower crash pad that has a panel shape to block a steering column to prevent exposure of the steering column to an indoor space of a vehicle, and includes a housing unit having recesses dented toward the steering column such that the housing unit is spaced apart from the steering column by a designated distance. An airbag module of the knee airbag includes an inflator and a cushion and contained in the housing unit of the lower crash pad to deploy the cushion toward a driver's knee outside the lower crash pad when the cushion is deployed by explosion of the inflator.

12 Claims, 5 Drawing Sheets

(51) Int. Cl.
  *B60R 21/231* (2011.01)
  *B62D 1/187* (2006.01)
  *B62D 1/19* (2006.01)
  *B60R 21/00* (2006.01)
  *B60R 21/04* (2006.01)

(56) References Cited

U.S. PATENT DOCUMENTS

| | | | | |
|---|---|---|---|---|
| 8,056,922 B2* | 11/2011 | Mitsuo | ............... | B60R 21/2032 |
| | | | | 280/728.2 |
| 8,096,578 B2* | 1/2012 | Wigger | ................ | B60R 21/231 |
| | | | | 280/732 |
| 8,128,122 B2* | 3/2012 | Fukawatase | .......... | B60R 21/203 |
| | | | | 280/730.1 |
| 8,540,276 B2* | 9/2013 | Schneider | ............ | B60R 21/237 |
| | | | | 280/730.1 |
| 8,746,732 B1* | 6/2014 | Kutchey | ............. | B60R 21/2171 |
| | | | | 280/728.2 |
| 2003/0127838 A1* | 7/2003 | Freisler | ................ | B60R 21/205 |
| | | | | 280/732 |

FOREIGN PATENT DOCUMENTS

| | | |
|---|---|---|
| KR | 20-1998-0025958 U | 8/1998 |
| KR | 101073533 B1 | 10/2011 |
| KR | 101198837 B1 | 11/2012 |
| WO | 2008/053981 A1 | 5/2008 |
| WO | 2009119184 A1 | 10/2009 |

* cited by examiner

KNEE AIRBAG FOR VEHICLES

CROSS-REFERENCE TO RELATED APPLICATION

This application claims the priority benefit of Korean Patent Application No. 10-2019-0043466, filed on Apr. 15, 2019, the disclosure of which is incorporated herein by reference.

BACKGROUND

1. Field of the Invention

The present invention relates to a knee airbag for vehicles in which an airbag module is provided within a housing unit formed on a lower crash pad in the field of vehicle safety apparatuses, and when an airbag cushion is deployed, the housing unit is supported to more accurately deploy the airbag cushion toward a driver's knee.

2. Description of the Related Art

In general, airbag modules are installed within a vehicle and protect passengers during a vehicle collision. The airbag module includes an inflator and an airbag cushion. In the airbag module, when a vehicle collision occurs, gas is injected into the airbag cushion through the inflator, and the airbag cushion is deployed toward an indoor space of the vehicle to absorb impact applied to a passenger and thus protects the passenger.

To increase safety of a vehicle during a collision, various airbags, such as a curtain airbag, a trim airbag, a side airbag and a front central airbag, are installed within the vehicle. A driver's seat knee airbag that corresponds to one type of airbag is deployed toward a driver's knee during a front collision or partial front collision of the vehicle, and thus avoids injury to the driver's knee.

The conventional driver's knee airbag is mounted on a cowl cross bar of a vehicle body by a cantilever. Since one end of the cantilever is fixed, when the knee airbag is deployed, an airbag module of the knee airbag is vulnerable to shaking of the vehicle body in forward and backward directions. Accordingly, the conventional driver's knee airbag includes a separate bracket to support the airbag module, and thereby the overall weight of the vehicle is increased. Nevertheless, when the knee airbag is deployed, an airbag cushion may be deployed toward the inside of a lower crash pad due to shaking of the airbag module, or the lower crash pad may be separated and thus inflict an injury on a driver due to excessive rigidity of the bracket.

Further, in order to solve problems, such as noise generation caused by the bracket, installation of a separate noise prevention pad is required and serves as an additional factor to increase vehicle production costs. Therefore, a novel knee airbag for vehicles to solve the above-described problems is required.

The above description has been provided to aid in understanding of the background of the present invention and should not be interpreted as conventional technology known to those skilled in the art.

SUMMARY

Therefore, the present invention provides a knee airbag for vehicles in which an airbag module is provided within a housing unit formed on a lower crash pad in the field of vehicle safety apparatuses and, when an airbag cushion is deployed, the housing unit is supported to more accurately deploy the airbag cushion toward a driver's knee.

In accordance with the present invention, a knee airbag for vehicles may include a lower crash pad having a panel shape to block a steering column to prevent exposure of the steering column to an indoor space of a vehicle, and having a housing unit including recesses dented toward the steering column such that the housing unit is spaced apart from the steering column by a designated distance, and an airbag module including an inflator and a cushion and contained in the housing unit of the lower crash pad to deploy the cushion toward a driver's knee outside the lower crash pad when the cushion is deployed by explosion of the inflator.

The distance between the housing unit of the lower crash pad and the steering column may be a maximum deformation distance or less of the housing unit by explosion of the inflator. The housing unit of the lower crash pad may be formed integrally with the lower crash pad. Additionally, the housing unit of the lower crash pad may be disposed between the steering column and a driver's seat. The housing unit of the lower crash pad may include a bottom surface that forms a bottom of the housing unit having the recesses formed thereon, and side surfaces that surround the bottom surface.

The inflator of the airbag module may be mounted on the bottom surface of the housing unit of the lower crash pad. Additionally, the inflator of the airbag module may be mounted on the side surface located at a front side of the vehicle among the side surfaces of the housing unit. The knee airbag for vehicles may further include a plurality of ribs having a panel shape such that a front end of each of the ribs is connected to the side surface located at a rear side of the vehicle among the side surfaces of the housing unit and a rear end of each of the ribs is connected to an inner surface of the lower crash pad.

The ribs may be disposed to be spaced apart from one another in a width direction of the vehicle. The knee airbag may further include a stopper having a frame shape coupled to a lower portion of the steering column and tilted up and down together with tilt-up and down of the steering column, and the housing unit of the lower crash pad may be supported by the stopper when the housing unit retreats to an upper portion or a front portion of the vehicle by deployment pressure when the cushion is deployed.

The stopper may include a first part having a panel shape that extends from a point of the stopper coupled to the steering column to a rear portion of the vehicle and a second part having a panel shape that extends from the point of the stopper coupled to the steering column to a lower portion of the vehicle, and the first part and the second part of the stopper may be spaced apart from the housing unit of the lower crash pad by a designated distance.

When the steering column is tilted up, the housing unit may be supported by the second part of the stopper when the housing unit of the lower crash pad retreats to the upper portion or the front portion of the vehicle by deployment pressure generated by deployment of the cushion. When the steering column is tilted down, the housing unit may be supported by the first part of the stopper when the housing unit of the lower crash pad retreats to the upper portion or the front portion of the vehicle by deployment pressure generated by deployment of the cushion.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Reference will now be made in detail to the exemplary embodiments of the present invention, examples of which are illustrated in the accompanying drawings. Wherever possible, the same reference numbers will be used throughout the drawings to refer to the same or like parts.

Figure 1:
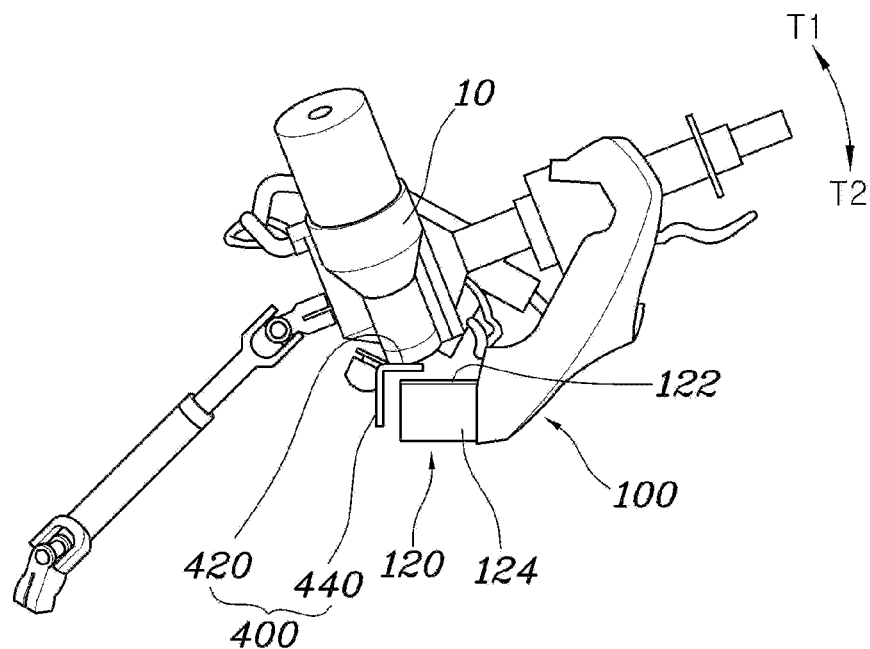
FIG. 1 is a perspective view illustrating a knee airbag for vehicles in accordance with an exemplary embodiment of the present invention.
Figure 2:
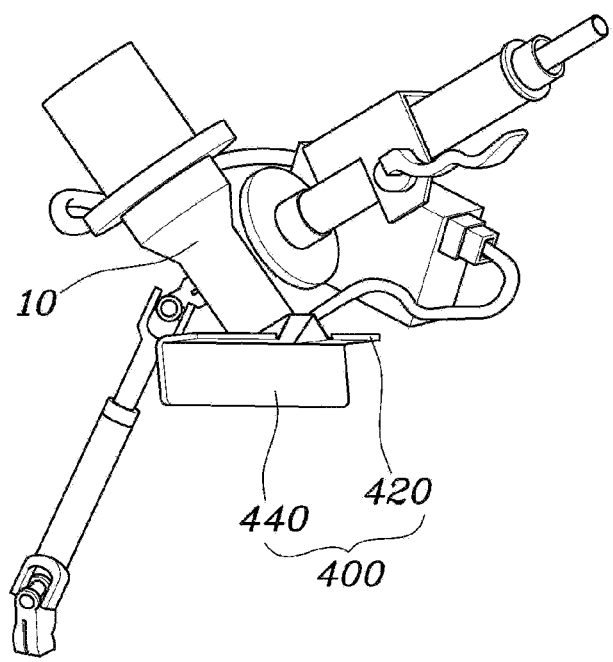
FIG. 2 is a perspective view illustrating a state in which a stopper of the knee airbag for vehicles in accordance with an exemplary embodiment of the present invention is coupled to a steering column.
Figure 6:
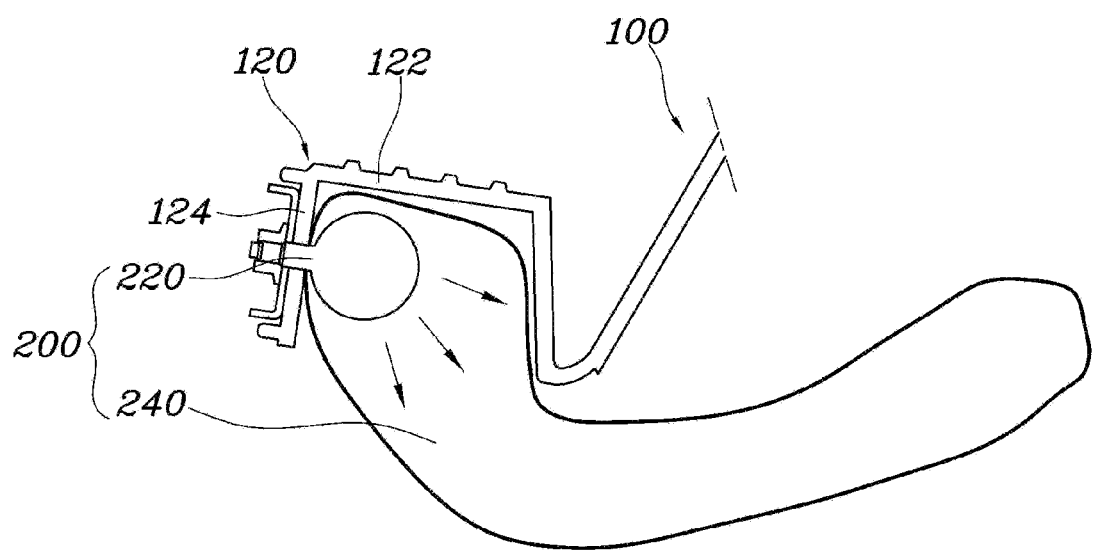
FIG. 6 is a side view illustrating a deployed state of a cushion of the knee airbag for vehicles in accordance with an exemplary embodiment of the present invention.

A knee airbag for vehicles in accordance with the present invention may include a lower crash pad 100 having a panel shape to block a steering column 10 to prevent exposure of the steering column 10 to an indoor space of a vehicle and provided with a housing unit 120 having recesses dented toward the steering column 10 such that the housing unit 120 is spaced apart from the steering column 10 by a designated distance, and an airbag module 200 having an inflator 220 and a cushion 240 and contained within the housing unit 120 of the lower crash pad 100 to deploy the cushion 240 toward a driver's knee outside the lower crash pad 100 when the cushion 240 is deployed by explosion of the inflator 200, as exemplarily shown in FIGS. 1, 2 and 6.

In the present invention, the lower crash pad 100 is provided. The lower crash pad 100 forms a lower end part of a crash pad at a driver's seat, and may be coupled to a main crash pad (not shown) forming an upper end part of the crash pad. Further, as exemplarily shown in FIGS. 1 and 3, the housing unit 120 having the recesses dented toward the steering column 10 may be disposed on the lower crash pad 100. The housing unit 120 may be formed to be spaced apart from the steering column 10 by the designated or predetermined distance. In general, a steering column of a vehicle may be tilted up or tilted down to adjust the angle of a steering wheel to further improve steerability of a driver. As exemplarily shown in FIG. 1, when the steering column 10 is tilted up, the steering column 10 is moved in a direction T1, and, when the steering column 10 is tilted down, the steering column 10 is moved in a direction T2. Consequently, the steering column 10 and the housing unit 120 are spaced apart from each other by the designated distance to prevent interference with each other when the steering column 10 is tilted up or tilted down in the direction T1 or T2.

Further, as exemplarily shown in FIGS. 1 and 6, in the present invention, the airbag module 200 including the inflator 220 and the cushion 240 is provided. The airbag module 200 may be contained within the housing unit 120 of the lower crash pad 100, and the cushion 240 may be deployed toward a driver's knee outside the lower crash pad 100 when the cushion 240 is deployed by explosion of the inflator 200. FIG. 6 illustrates the cushion 240 in a deployed state, and the cushion 240 confines the driver's knee when front collision of the vehicle occurs and thus protects a driver's lower body.

In particular, the distance between the housing unit 120 of the lower crash pad 100 and the steering column 10 may be the maximum deformation distance or less of the housing unit 120 by explosion of the inflator 220. When the cushion 240 is deployed by explosion of the inflator 220, the housing unit 120 of the lower crash pad 100 may retreat toward the steering column 10 by deployment pressure. When the retreating housing unit 120 is not supported, the housing unit 120 may retreat further to a front portion or an upper portion of the vehicle, and thus the cushion 240 of the airbag module 200 may not be normally deployed. To prevent such a problem or erroneous deployment, in the present invention, the housing unit 120 of the lower crash pad 100 may be supported by the steering column 10 when the housing unit 120 retreats toward the steering column 10.

The housing unit 120 may be supported by the steering column 10 even when the housing unit 120 retreats toward the steering column 10, and thus the housing unit 120 may not further retreat toward the front portion or the upper portion of the vehicle any more. Therefore, the cushion 240 of the airbag module 200 may be normally deployed toward the driver's knee. Accordingly, the housing unit 120 of the lower crash pad 100 and the steering column 10 may be disposed such that the distance between the housing unit 120 and the steering column 10 is the maximum deformation distance or less of the housing unit 120. Thus, when the steering column 10 is tilted up in the direction T1 or tilted down in the direction T2, the housing unit 120 and the steering column 10 may not interfere with each other, and, when the cushion 240 of the airbag module 200 is deployed, the housing unit 120 of the lower crash pad 100 may be supported by the steering column 10.

Figure 3:
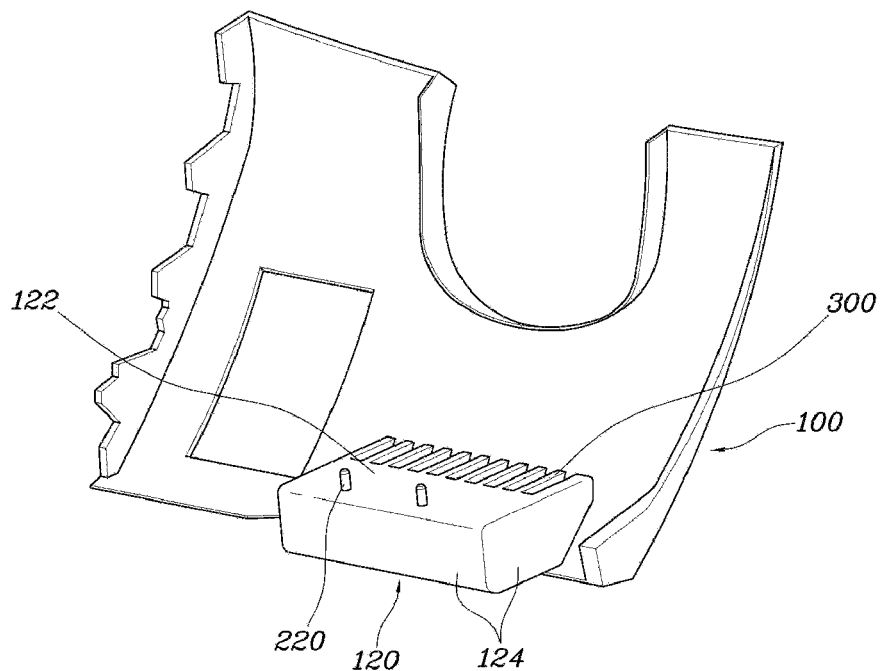
FIG. 3 is a perspective view illustrating a lower crash pad of the knee airbag for vehicles in accordance with an exemplary embodiment of the present invention.

FIG. 3 illustrates the lower crash pad 100 of the knee airbag for vehicles in accordance with an exemplary embodiment of the present invention. The housing unit 120 of the lower crash pad 100 may be formed integrally with the lower crash pad 100. The lower crash pad 100 may be formed of plastic through plastic injection molding. In particular, the housing unit 120 may be formed integrally with the lower crash pad 100, and thus a manufacturing process of the lower crash pad 100 may be simplified. When the housing unit 120 is formed integrally with the lower crash pad 100, coupling strength of a connection portion between the housing unit 120 and the lower crash pad 100 may be increased, compared to when a housing unit is manufactured separately and then coupled to a lower crash pad.

Therefore, separation of the housing unit 120 from the lower crash pad 100 caused by rupture or breakage of the housing unit 120 due to deployment pressure when the cushion 240 of the airbag module 200 is deployed may be prevented. When the housing unit 120 is separated from the lower crash pad 100 caused by rupture or breakage of the housing unit 120, the cushion 240 of the airbag module 200 may not be normally deployed. Therefore, since separation of the housing unit 120 from the lower crash pad 100 caused by rupture or breakage of the housing unit 120 when the cushion 240 of the airbag module 200 is deployed may be prevented, the cushion 240 may be deployed more accurately toward the driver's knee. Consequently, by forming the housing unit 120 integrally with the lower crash pad 100, coupling strength between the housing unit 120 and the lower crash pad 100 may be increased and a manufacturing process of the lower crash pad 100 may be simplified.

Referring to FIGS. 1 and 6, the housing unit 120 of the lower crash pad 100 of the knee airbag for vehicles in accordance with the present invention may be disposed between the steering column 10 and the driver's seat. Accordingly, by disposing the housing unit 120 of the lower crash pad 100 between the driver's seat and the steering column 10, the cushion 240 may be deployed more accurately toward the driver's knee when the cushion 240 of the airbag module 200 is deployed, and the housing unit 120 may be supported by the steering column 10 when the housing unit 120 retreats by deployment pressure.

Figure 4:
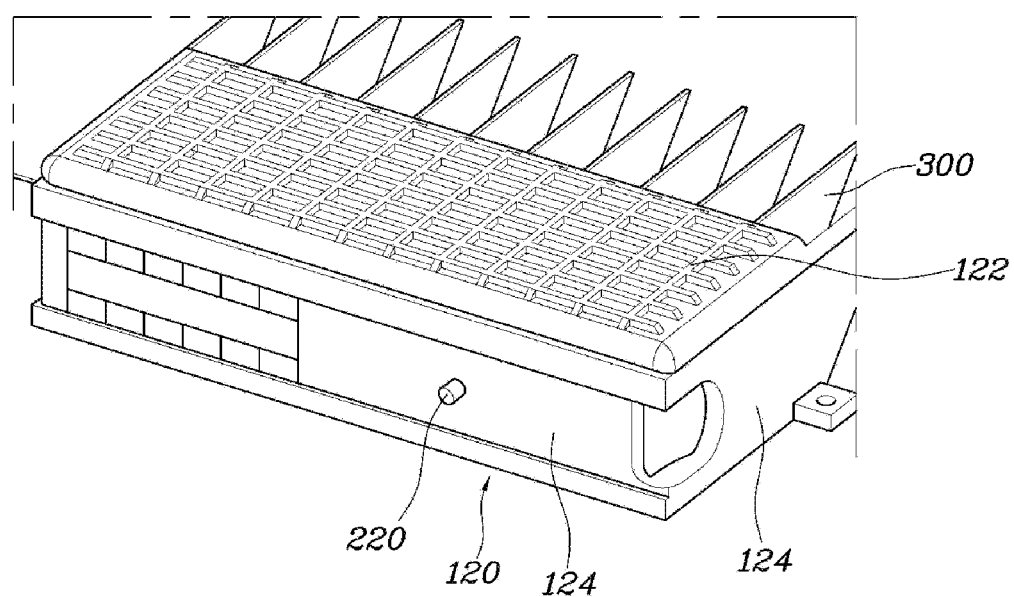
FIG. 4 is a perspective view illustrating a housing unit and ribs of the knee airbag for vehicles in accordance with an exemplary embodiment of the present invention.

Further, as exemplarily shown in FIGS. 3 and 4, the housing unit 120 of the lower crash pad 100 may include a bottom surface 122 forming a bottom of the housing unit 120 provided with the recesses dented toward the steering column 10 and side surfaces 124 configured to surround the bottom surface 122. The housing unit 120 may include the recesses, and thus, the airbag module 200 may be received in the housing unit 120. Further, since the side surfaces 124 of the housing unit 120 are closed, the cushion 240 does not contact air and moisture in the air, and thus, the cushion 240 of the airbag module 200 may maintain initial quality thereof without deformation.

Figure 5:
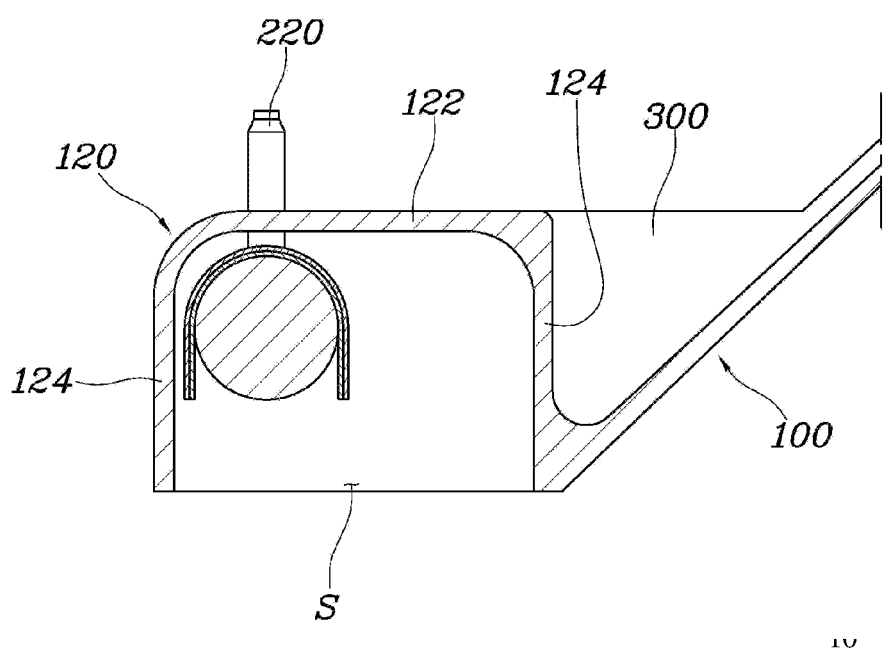
FIG. 5 is a cross-sectional view of the housing unit of the knee airbag for vehicles in accordance with an exemplary embodiment of the present invention.

Referring to FIGS. 5 and 6, an inlet of the housing unit 120 may be formed at a lower portion of the housing unit 120 facing the bottom surface 122. Although FIG. 5 does not show the inlet of the housing unit 120, the inlet of the housing unit 120 may be provided at a portion of the housing unit 120, indicated by reference mark "S". The inlet of the housing unit 120 may be formed integrally with the housing unit 120, or be separately manufactured and then disposed as a door at the lower portion of the housing 120. When the inlet of the housing unit 120 is formed integrally with the housing unit 120, a breaking line or a cutting line is formed, the inlet of the housing 120 may be opened by cutting along the breaking line or the cutting line, and thus the cushion 240 may be deployed. When the inlet of the housing unit 120 is provided as a door, the cushion 240 may be deployed according to opening of the door.

Further, as exemplarily shown in FIG. 5, the inflator 220 of the airbag module 200 may be mounted on the bottom surface 122 of the housing unit 120 of the lower crash pad 100. Additionally, as exemplarily shown in FIG. 6, the inflator 220 of the airbag module 200 may be mounted on the side surface 124 disposed at a front side of the vehicle among the side surfaces 124 of the housing unit 120. Further, it is apparent that the inflator 220 of the airbag module 200 in accordance with the present invention may be mounted at any position of the housing unit 120 which enables the cushion 240 to be normally deployed when collision of the vehicle occurs.

Referring to FIGS. 4 and 5, the knee airbag for vehicles in accordance with the present invention may further include a plurality of ribs 300 having a panel shape, front ends of which are connected to the side surface 124 disposed at a rear side of the vehicle among the side surfaces 124 of the housing unit 120, and rear ends of which are connected to the inner surface of the lower crash pad 100. The front end of each rib 300 may be connected to the side surface 124 located at the rear side of the vehicle among the side surfaces 124 of the housing unit 120, and the rear end of each rib 300 may be connected to the inner surface of the lower crash pad 100. These ribs 300 may increase coupling strength between the lower crash pad 100 and the housing unit 120 of the lower crash pad 100.

Therefore, the risk of separating the housing unit 120 from the lower crash pad 100 caused by rupture or breakage of the housing unit 120 when the cushion 240 of the airbag module 200 is deployed may be reduced. When the housing unit 120 is separated from the lower crash pad 100 caused by rupture or breakage of the housing unit 120, the cushion 240 is not normally deployed toward the driver's knee. Therefore, in the present invention, the ribs 300 increase coupling strength between the lower crash pad 100 and the housing unit 120 and thus solve such a problem.

As exemplarily shown in FIG. 4, the ribs 300 may be disposed to be spaced apart from one another in a width direction of the vehicle. Such disposition of the ribs 300 may increase coupling strength between the lower crash pad 100 and the housing unit 120. Further, a vacant space may be formed between neighboring ribs 300 and thus the overall weight of the vehicle may be reduced, compared to when a space between a side surface of a housing unit of a lower crash pad and an inner surface of the lower crash pad is fully filled with a connection member.

Figure 7:
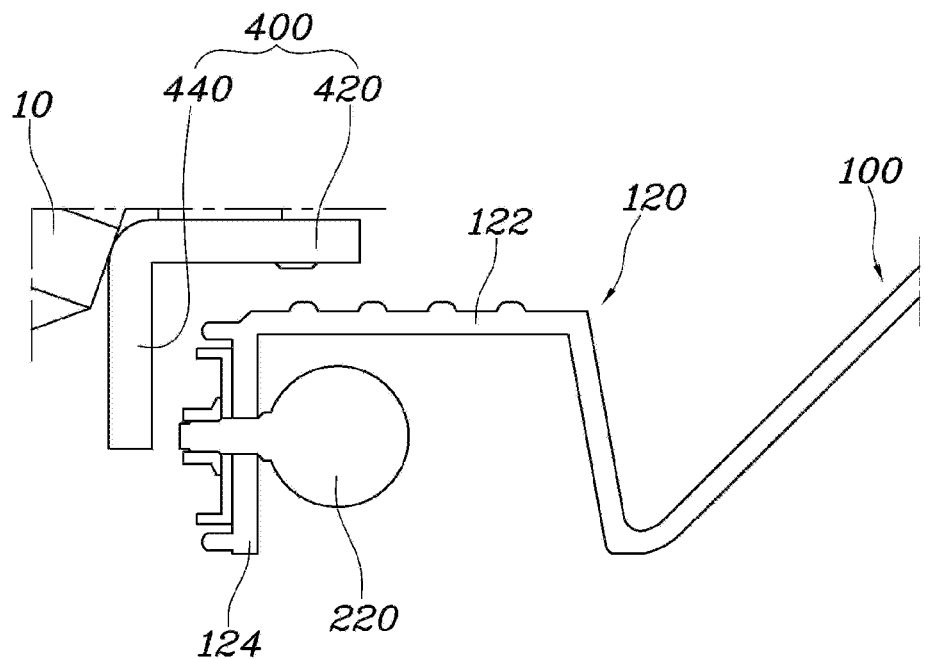
FIG. 7 is a side view illustrating the housing unit and the stopper of the knee airbag for vehicles in accordance with an exemplary embodiment of the present invention.

Further, as exemplarily shown in FIGS. 1, 2 and 7, the knee airbag for vehicles in accordance with the present invention may further include a stopper 400 having a frame shape coupled to a lower portion of the steering column 10 and tilted up and down together with tilt-up and down of the steering column 10, and the housing unit 120 of the lower crash pad 100 may be supported by the stopper 400 when the housing unit 120 retreats to the upper portion or the front portion of the vehicle by deployment pressure when the cushion 240 is deployed.

In particular, the stopper 400 may include a first part 420 having a panel shape that extends from a point of the stopper 400 coupled to the steering column 10 to a rear portion of the vehicle and a second part 440 having a panel shape that extends from the point of the stopper 400 coupled to the steering column 10 to a lower portion of the vehicle, and the first part 420 and the second part 440 of the stopper 400 may be spaced apart from the housing unit 120 of the lower crash pad 100 by a designated distance.

The stopper 400 may be coupled to the lower portion of the steering column 10, and may be tilted up and down together with tilt-up and down of the steering column 10. The stopper 400 supports the housing unit 120 of the lower crash pad 100 when the housing unit 120 retreats to the upper portion or the front portion of the vehicle when the cushion 240 is deployed, and thus restricts the distance from the housing 120. Therefore, since the housing unit 120 is supported by the stopper 400, the cushion 240 may be deployed exactly toward the driver's knee. The stopper 400 may include the first part 420 and the second part 440.

Particularly, the first part 420 of the stopper 400 may be formed to have a panel shape that extends from the point of the stopper 400 coupled to the steering column 10 to the rear portion of the vehicle, and the second part 440 of the stopper 400 may be formed to have a panel shape that extends from the point of the stopper 400 coupled to the steering column 10 to the lower portion of the vehicle. In addition, the housing unit 120 may be supported by the first part 420 or the second part 440 of the stopper 400. The stopper 400 may be coupled to the lower portion of the steering column 10 by a method, such as bolting or welding. Further, when the steering column 10 is tilted up and down, the first part 420 and the second part 440 of the stopper 400 do not interfere with the housing unit 120 of the lower crash pad 100 since the first part 420 and the second part 440 of the stopper 400 may be spaced apart from the housing unit 120 of the lower crash pad 100.

Figure 8:
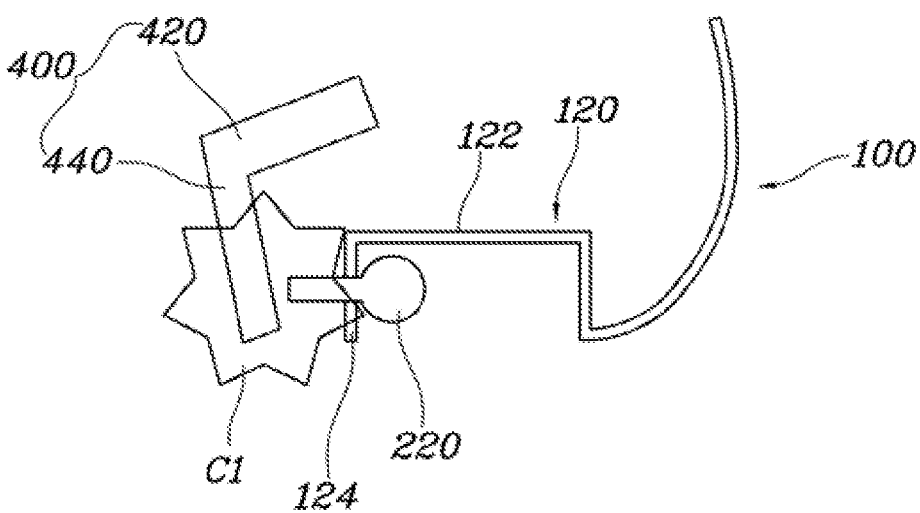
FIG. 8 is a side view illustrating a tilt-up state of the stopper of the knee airbag for vehicles in accordance with an exemplary embodiment of the present invention.
Figure 9:
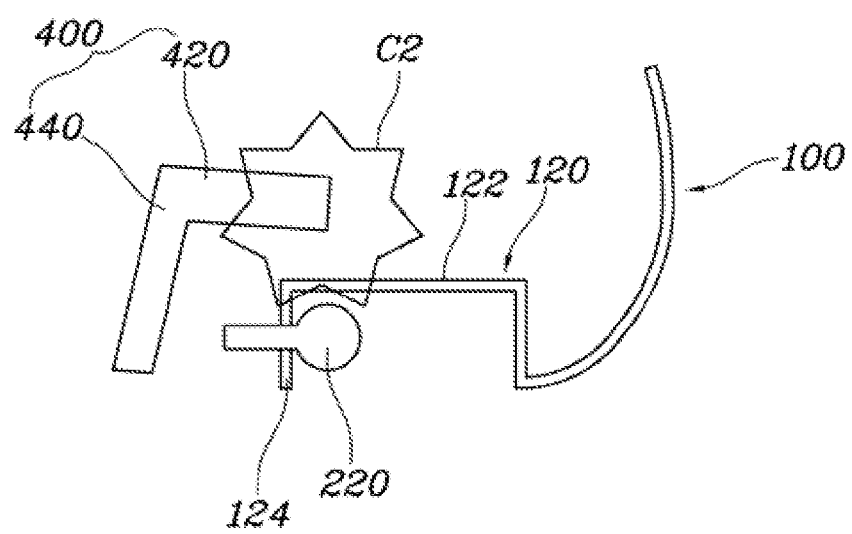
FIG. 9 is a side view illustrating a tilt-down state of the stopper of the knee airbag for vehicles in accordance with an exemplary embodiment of the present invention.

FIG. 8 is a side view illustrating the tilt-up state of the stopper of the knee airbag for vehicles in accordance with an exemplary embodiment of the present invention, and FIG. 9 is a side view illustrating the tilt-down state of the stopper of the knee airbag for vehicles in accordance with an exemplary embodiment of the present invention. Reference mark C1 in FIG. 8 indicates that the housing unit 120 is supported by the second part 440 of the stopper 400, and reference mark C2 in FIG. 9 indicates that the housing unit 120 is supported by the first part 420 of the stopper 400.

When the steering column 10 is tilted up, as exemplarily shown in FIG. 8, the housing unit 120 may be supported by the second part 440 of the stopper 400 when the housing unit 120 of the lower crash pad 100 retreats to the upper portion or the front portion of the vehicle by deployment pressure when the cushion 240 is deployed. When the steering column 10 is tilted up, the stopper 400 is tilted up together with tilt-up of the steering column 10. Therefore, the second part 440 of the stopper 400 may be disposed proximate to the housing unit 120 of the lower crash pad 100, and thus the housing unit 120 may be supported by the second part 440 of the stopper 400 (C1).

On the contrary, when the steering column 10 is tilted down, as exemplarily shown in FIG. 9, the housing unit 120 may be supported by the first part 420 of the stopper 400 when the housing unit 120 of the lower crash pad 100 retreats to the upper portion or the front portion of the vehicle by deployment pressure when the cushion 240 is deployed. When the steering column 10 is tilted down, the stopper 400 may be tilted down together with tilt-down of the steering column 10. Therefore, the first part 420 of the stopper 400 may be disposed proximate to the housing unit 120 of the lower crash pad 100, and thus the housing unit 120 may be supported by the first part 420 of the stopper 400 (C2).

In the knee airbag for vehicles in accordance with the present invention, the airbag module is provided within the housing unit formed on the lower crash pad in the field of vehicle safety apparatuses and, when the airbag cushion is deployed, the housing unit is supported and thus, the airbag cushion may be deployed more accurately toward a driver's knee. Particularly, an inner structure of the lower crash pad of the knee airbag may be improved, and thus, the weight of the vehicle may be reduced, an assembly process of the vehicle may be simplified, and noise of the vehicle may be reduced.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A knee airbag for vehicles, comprising:
a lower crash pad having a panel shape to block a steering column to prevent exposure of the steering column to an indoor space of a vehicle, and including a housing unit having recesses dented toward the steering column such that the housing unit is spaced apart from the steering column by a designated distance;
an airbag module include an inflator and a cushion and contained in the housing unit of the lower crash pad to deploy the cushion toward a driver's knee outside the lower crash pad when the cushion is deployed by explosion of the inflator; and
a stopper having a frame shape coupled to a lower portion of the steering column and tilted up and down together with tilt-up and down of the steering column,
wherein the housing unit of the lower crash pad is supported by the stopper when the housing unit retreats to an upper portion or a front portion of the vehicle by deployment pressure when the cushion is deployed.

2. The knee airbag for vehicles according to claim 1, wherein the distance between the housing unit of the lower crash pad and the steering column is a maximum deformation distance or less of the housing unit by explosion of the inflator.

3. The knee airbag for vehicles according to claim 1, wherein the housing unit of the lower crash pad is formed integrally with the lower crash pad.

4. The knee airbag for vehicles according to claim 1, wherein the housing unit of the lower crash pad is disposed between the steering column and a driver's seat.

5. The knee airbag for vehicles according to claim 1, wherein the housing unit of the lower crash pad includes a bottom surface configured to form a bottom of the housing unit provided with the recesses formed thereon, and side surfaces configured to surround the bottom surface.

6. The knee airbag for vehicles according to claim 5, wherein the inflator of the airbag module is mounted on the bottom surface of the housing unit of the lower crash pad.

7. The knee airbag for vehicles according to claim 5, wherein the inflator of the airbag module is mounted on the side surface located at a front side of the vehicle among the side surfaces of the housing unit.

8. The knee airbag for vehicles according to claim 5, further comprising:
a plurality of ribs configured to have a panel shape to connect a front end of each of the ribs to the side surface disposed at a rear side of the vehicle among the side surfaces of the housing unit and to connect a rear end of each of the ribs to an inner surface of the lower crash pad.

9. The knee airbag for vehicles according to claim 8, wherein the ribs are disposed to be spaced apart from one another in a width direction of the vehicle.

10. The knee airbag for vehicles according to claim 1, wherein the stopper includes:
   a first part having a panel shape that extends from a point of the stopper coupled to the steering column to a rear portion of the vehicle; and
   a second part having a panel shape that extends from the point of the stopper coupled to the steering column to a lower portion of the vehicle,
   wherein the first part and the second part of the stopper are spaced apart from the housing unit of the lower crash pad by a designated distance.

11. The knee airbag for vehicles according to claim 10, wherein, when the steering column is tilted up, the housing unit is supported by the second part of the stopper when the housing unit of the lower crash pad retreats to the upper portion or the front portion of the vehicle by deployment pressure generated by deployment of the cushion.

12. The knee airbag for vehicles according to claim 10, wherein, when the steering column is tilted down, the housing unit is supported by the first part of the stopper when the housing unit of the lower crash pad retreats to the upper portion or the front portion of the vehicle by deployment pressure generated by deployment of the cushion.

* * * * *